United States Patent
Kidokoro et al.

(10) Patent No.: US 10,749,615 B2
(45) Date of Patent: Aug. 18, 2020

(54) BURST ERROR ADDITION DEVICE, TEST SIGNAL GENERATION DEVICE USING SAME, AND BURST ERROR ADDITION METHOD

(71) Applicant: ANRITSU CORPORATION, Kanagawa (JP)

(72) Inventors: Hisao Kidokoro, Kanagawa (JP); John Jerico Manuel Custodio, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/665,141

(22) Filed: Oct. 28, 2019

(65) Prior Publication Data
US 2020/0235828 A1  Jul. 23, 2020

(30) Foreign Application Priority Data
Jan. 23, 2019 (JP) ................. 2019-009380

(51) Int. Cl.
| | | |
|---|---|---|
| H04B 17/16 | (2015.01) | |
| H04L 27/04 | (2006.01) | |
| H04L 25/49 | (2006.01) | |
| H04B 17/00 | (2015.01) | |

(52) U.S. Cl.
CPC ......... *H04B 17/16* (2015.01); *H04B 17/0085* (2013.01); *H04L 25/4917* (2013.01); *H04L 27/04* (2013.01)

(58) Field of Classification Search
CPC . H04B 17/16; H04B 17/0085; H04L 25/4917; H04L 27/04
See application file for complete search history.

(56) References Cited

U.S. PATENT DOCUMENTS

| | | | |
|---|---|---|---|
| 9,584,345 B1* | 2/2017 | Baecher | H04L 25/4917 |
| 9,699,009 B1* | 7/2017 | Ainspan | H04B 1/16 |
| 10,404,289 B1* | 9/2019 | Riani | H03M 13/3916 |
| 10,491,436 B1* | 11/2019 | Lim | H03K 17/6872 |
| 2004/0193995 A1* | 9/2004 | Park | H03M 13/136 714/752 |
| 2006/0277434 A1* | 12/2006 | Tsern | G06F 11/0793 714/17 |
| 2010/0174971 A1* | 7/2010 | Furuya | H04L 1/0079 714/800 |
| 2019/0044766 A1* | 2/2019 | Lin | H04L 25/03038 |
| 2019/0363917 A1* | 11/2019 | Iwai | H04B 10/524 |
| 2020/0067568 A1* | 2/2020 | Spirkl | H04B 1/0475 |

FOREIGN PATENT DOCUMENTS

JP  5215881 B2  6/2013

* cited by examiner

*Primary Examiner* — David Bilodeau
(74) *Attorney, Agent, or Firm* — Pearne & Gordon LLP

(57) ABSTRACT

There are included an error signal generation unit that generates an error signal for adding a burst error to each of an MSB and an LSB of the PAM4 signal in units of clock cycles, an error addition unit that performs an exclusive OR operation on the MSB and the LSB and the error signal and outputs bit strings obtained as a result of the operation, and a calculation unit that calculates the minimum number of clock cycles required for realizing a bit error rate of a desired test signal and the number of burst errors to be added to the MSB and the LSB during a period of the minimum number of the clock cycles.

7 Claims, 5 Drawing Sheets

BURST ERROR ADDITION DEVICE, TEST SIGNAL GENERATION DEVICE USING SAME, AND BURST ERROR ADDITION METHOD

TECHNICAL FIELD

The present disclosure relates to a burst error addition device, a test signal generation device using the same, and a burst error addition method, and specifically relates to a burst error addition device, a test signal generation device using the same, and a burst error addition method for generating a test signal for measuring an error rate of a communication apparatus using PAM4 transmission.

BACKGROUND ART

In recent years, a communication system has been increased in speed, and various communication apparatuses constituting the communication system have been improved in performance. A bit error rate defined as a comparison between the number of bit errors in received data and a total number of received data is known as one of an indicator of signal quality evaluation in these communication apparatuses.

In a standard such as 200G or 400G defined by IEEE, transmission using a PAM4 signal is defined instead of transmission using a PAM2 (non return to zero (NRZ)) signal so as to respond to an extremely high bit rate. The PAM4 signal is configured to include four PAM4 symbols including "0 (00)", "1 (01)", "2 (10)", and "3 (11)".

In transmission using a PAM4 signal, precoding is used as an encoding method for removing a burst error. A precode encoder which performs precoding in a transmission apparatus performs a process of converting the PAM4 signal into a precode symbol P(j) according to the following equations (1) and (2).

$$P(j+1)=(G(j+1)-P(j)) \bmod 4 \quad \text{Equation (1)}$$

$$P(1)=G(1) \quad \text{Equation (2)}$$

Here, j is an integer equal to or more than 1. P(j) is a j-th precode symbol. G (j) is a j-th gray code symbol, and four PAM4 symbols of 0, 1, 2, and 3 in a PAM4 signal are respectively converted to 0, 1, 3, and 2.

On the other hand, a precode decoder which decodes the precoded PAM4 signal in a transmission apparatus performs a process of converting the precode symbol P(j) into a gray code G(j) according to the following equations (3) and (4).

$$G(j+1)=(P(j+1)+P(j)) \bmod 4 \quad \text{Equation (3)}$$

$$G(1)=P(1) \quad \text{Equation (4)}$$

Here, j is an integer equal to or more than 1. P(j) is a j-th precode symbol. G(j) is a j-th gray code symbol.

FIG. 5 illustrates an example of a most significant bit (MSB) and a least significant bit (LSB) of the precoded PAM4 symbol output from the precode encoder, and an example of an MSB and an LSB of the gray code output from the precode decoder in a case where an error is added to the PAM4 symbol output from the precode encoder. The hatching area in FIG. 5 indicates a bit or a symbol to which the error is added. In addition, a field of "transition difference" in FIG. 5 illustrates a level difference between the precoded PAM4 symbol before the error is added and the precoded PAM4 symbol after the error is added.

As illustrated in FIG. 5, for example, in a case where an error of 1 bit is added to only an MSB of the precoded PAM4 symbol, an error of 2 bits is generated in a gray code of MSB after decoding. On the other hand, in a case where a burst error of n bits (n≥2) is added to only the MSB of the precoded PAM4 symbol, an error of 2 bits is generated in the gray code of MSB after decoding. In this manner, precoding is a very effective encoding method for removing a burst error added to the MSB.

In the related art, in order to generate a test signal for measuring an error rate in a communication apparatus, an error addition device which adds an error to a data signal is used (for example, see Patent Document 1).

RELATED ART DOCUMENT

Patent Document

[Patent Document 1] Japanese Patent No. 5215881

DISCLOSURE OF THE INVENTION

Problem that the Invention is to Solve

In order to simulate a PAM4 level transition in a transmission path or the like, it is necessary to simultaneously add a burst error to an MSB and an LSB of a PAM4 symbol. Meanwhile, since the error addition device disclosed in Patent Document 1 does not include means for separating a PAM4 signal into an MSB and an LSB, a burst error cannot be added simultaneously to the MSB and the LSB of the PAM4 symbol. For this reason, the error addition device in the related art has a problem that a test signal for testing burst error tolerance of the precoded PAM4 signal cannot be generated.

The present invention is to provide a burst error addition device, a test signal generation device using the same, and a burst error addition method capable of generating a test signal for testing burst error tolerance of a communication apparatus which receives a precoded PAM4 signal.

Means for Solving the Problem

According to the present invention, there is provided a burst error addition device that adds a burst error to a precoded 4-level pulse amplitude modulation (PAM4) signal, the device including: a dividing unit that divides the precoded PAM4 signal into a most significant bit (MSB) and a least significant bit (LSB); an error signal generation unit that generates an error signal for adding the burst error to each of the MSB and the LSB in units of clock cycles; an error addition unit that performs an exclusive OR operation on the MSB and the LSB and the error signal and outputs bit strings obtained as a result of the operation; and a combination unit that combines the bit strings of the MSB and the LSB output from the error addition unit and outputs a PAM4 signal to which the burst error is added as a test signal.

In addition, the burst error addition device according to the present invention, further includes: a bit error rate input unit that receives a bit error rate of the test signal; an error bit number input unit that receives the number of error bits included in the burst error; a clock cycle bit number input unit that receives the number of bits of the PAM4 signal included in one clock cycle; and a calculation unit that calculates the minimum number of the clock cycles required for realizing the bit error rate and the number of burst errors to be added to the MSB and the LSB during a period of the minimum number of the clock cycles, based on the bit error rate input to the bit error rate input unit, the number of error bits input to the error bit number input unit, and the number of bits of the PAM4 signal included in one clock cycle input to the clock cycle bit number input unit, in which the error signal generation unit outputs the error signal for adding the burst errors corresponding to the number of burst errors calculated by the calculation unit to the MSB and the LSB, to the error addition unit, during a period of the minimum number of the consecutive clock cycles calculated by the calculation unit.

With this configuration, in the burst error addition device according to the present invention, it is possible to generate a test signal for testing burst error tolerance of a communication apparatus which receives a precoded PAM4 signal. In the burst error addition device according to the present invention, it is possible to evaluate tolerance for a burst error of the communication apparatus by changing a parameter such as a bit error rate or the like.

In addition, in the burst error addition device according to the present invention, the error signal generation unit may generate the error signal so that a pattern in which the one burst error is added to the MSB and the LSB for each of n clock cycles is repeated m times and a pattern in which one burst error is added to the MSB and the LSB for each of n+1 clock cycles is repeated p times, during a period of the minimum number of the consecutive clock cycles.

With this configuration, in the burst error addition device according to the present invention, it is possible to add the burst error to the MSB and the LSB of the precoded PAM4 signal at approximately equal intervals in time. In this manner, in the burst error addition device according to the present invention, it is possible to generate a test signal capable of efficiently measuring an error rate in a short time.

According to the present invention, there is provided a test signal generation device including: the burst error addition device described above; and a PAM4 signal output unit that outputs the precoded PAM4 signal to the dividing unit of the burst error addition device.

With this configuration, in the test signal generation device according to the present invention, it is possible to generate a test signal for testing burst error tolerance of a communication apparatus which receives a precoded PAM4 signal.

According to the present invention, there is provided a burst error addition method of adding a burst error to a precoded 4-level pulse amplitude modulation (PAM4) signal, the method including: a dividing step of dividing the precoded PAM4 signal into a most significant bit (MSB) and a least significant bit (LSB); an error signal generation step of generating an error signal for adding the burst error to each of the MSB and the LSB in units of clock cycles; an error addition step of performing an exclusive OR operation on the MSB and the LSB and the error signal and outputting bit strings obtained as a result of the operation; and a combination step of combining the bit strings of the MSB and the LSB output from the error addition step and outputting a PAM4 signal to which the burst error is added as a test signal.

In addition, the burst error addition method according to the present invention, further including: a bit error rate input step of receiving a bit error rate of the test signal; an error bit number input step of receiving the number of error bits included in the burst error; a clock cycle bit number input step of receiving the number of bits of the PAM4 signal included in one clock cycle; and a calculation step of calculating the minimum number of the clock cycles required for realizing the bit error rate and the number of burst errors to be added to the MSB and the LSB during a period of the minimum number of the clock cycles, based on the bit error rate input in the bit error rate input step, the number of error bits input in the error bit number input step, and the number of bits of the PAM4 signal included in one clock cycle input to the clock cycle bit number input unit, in which in the error signal generation step, the error signal for adding the burst errors corresponding to the number of burst errors calculated in the calculation step to the MSB and the LSB is output to the error addition step, during a period of the minimum number of the consecutive clock cycles calculated in the calculation step.

With this configuration, in the burst error addition method according to the present invention, it is possible to generate a test signal for testing burst error tolerance of a communication apparatus which receives a precoded PAM4 signal. In the burst error addition device according to the present invention, it is possible to evaluate tolerance for a burst error of the communication apparatus by changing a parameter such as a bit error rate or the like.

In addition, in the burst error addition method according to the present invention, in the error signal generation step, the error signal may be generated so that a pattern in which the one burst error is added to the MSB and the LSB for each of n clock cycles is repeated m times and a pattern in which one burst error is added to the MSB and the LSB for each of n+1 clock cycles is repeated p times, during a period of the minimum number of the consecutive clock cycles.

With this configuration, in the burst error addition method according to the present invention, it is possible to add the burst error to the MSB and the LSB of the precoded PAM4 signal at approximately equal intervals in time. In this manner, in the burst error addition device according to the present invention, it is possible to generate a test signal capable of efficiently measuring an error rate in a short time.

Advantage of the Invention

The present invention provides a burst error addition device, a test signal generation device using the same, and a burst error addition method capable of generating a test signal for testing burst error tolerance of a communication apparatus which receives a precoded PAM4 signal.

BEST MODE FOR CARRYING OUT THE INVENTION

Hereinafter, embodiments of a burst error addition device, a test signal generation device using the same, and a burst error addition method according to the present invention will be described by using the drawings.

Figure 1:
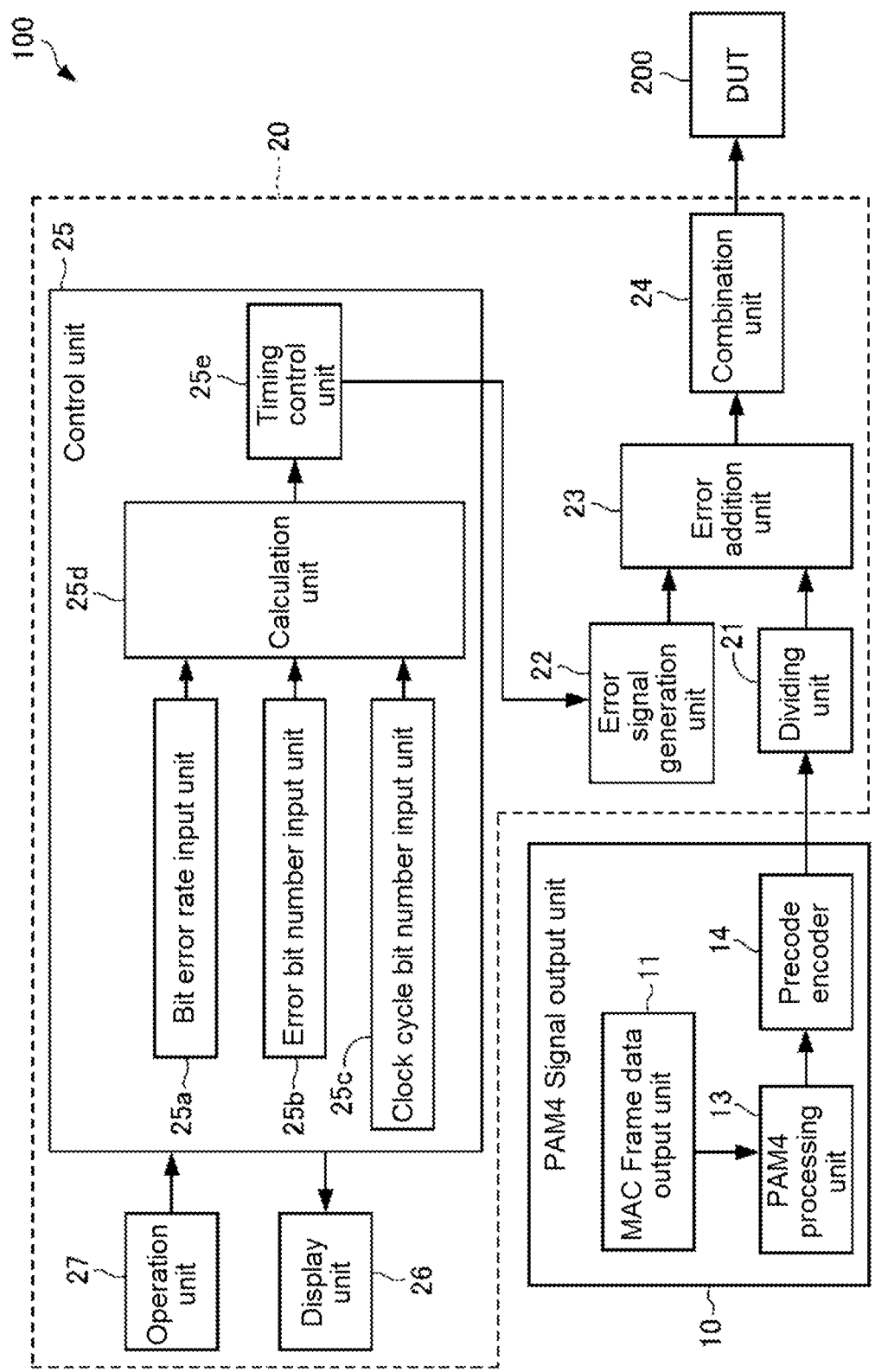
FIG. 1 is a block diagram illustrating a configuration of a test signal generation device according to an embodiment of the present invention.

As illustrated in FIG. 1, a test signal generation device 100 according to the embodiment of the present invention includes a PAM4 signal output unit 10 and a burst error addition device 20 which adds a burst error to a precoded PAM4 signal so as to output a test signal to a device under test (DUT) 200.

The PAM4 signal output unit 10 includes a medium access control (MAC) frame data output unit 11, a PAM4 processing unit 13, and a precode encoder 14. The MAC frame data output unit 11 is configured to output MAC frame data for testing the DUT 200 to the PAM4 processing unit 13 as test signal data.

The PAM4 processing unit 13 generates a PAM4 signal to be output from the MAC frame data output unit 11 by performing a process such as PAM4 encoding or the like defined in IEEE802.3. The PAM4 signal is configured to include four PAM4 symbols including "0 (00)", "1 (01)", "2 (10)", and "3 (11)".

The precode encoder 14 performs a process of converting a PAM4 signal output from the PAM4 processing unit 13 into a precode symbol P(j) according to the equations (1) and (2) already described.

The burst error addition device 20 includes a dividing unit 21, an error signal generation unit 22, an error addition unit 23, a combination unit 24, a control unit 25, a display unit 26, and an operation unit 27.

The dividing unit 21 divides a PAM4 signal output from the PAM4 processing unit 13 of the PAM4 signal output unit 10 into a most significant bit (MSB) and a least significant bit (LSB) of a PAM4 symbol.

The error signal generation unit 22 generates an error signal for adding a burst error to each of the MSB and the LSB of the PAM4 signal output from the dividing unit 21, in units of clock cycles. The clock cycle in the present embodiment is, for example, a clock cycle given from the control unit 25 to the error signal generation unit 22 and the dividing unit 21 in common.

That is, a timing of an error signal output from the error signal generation unit 22 is adjusted so as to be synchronized with bit string signals of the MSB and the LSB output from the dividing unit 21 by the clock from the control unit 25.

The error addition unit 23 performs an exclusive OR (XOR) operation on the MSB and the LSB of the PAM4 signal output from the dividing unit 21 and the error signal output from the error signal generation unit 22, and bit strings obtained as a result of the operation are output.

The combination unit 24 combines the bit strings of the MSB and the LSB output from the error addition unit 23 so as to generate a PAM4 signal to which a burst error is added, and outputs the PAM4 signal to which the burst error is added to the DUT 200 as a test signal.

The DUT 200 performs a process opposite to the PAM4 processing unit 13 on the test signal output from the test signal generation device 100 so as to decode the precode of the PAM4 symbol to which an error is added, and the bit strings of the MSB and the LSB is decoded from the PAM4 symbol.

The control unit 25 is configured to include, for example, a microcomputer or a personal computer including a central processing unit (CPU), a read only memory (ROM), a random access memory (RAM), a hard disk drive (HDD), and the like, and controls an operation of each of the units described above constituting the test signal generation device 100. In addition, the control unit 25 moves a predetermined program stored in the ROM or the like into the RAM and executes the program, so that a bit error rate input unit 25a, an error bit number input unit 25b, a clock cycle bit number input unit 25c, a calculation unit 25d, and a timing control unit 25e to be described below can be configured in software.

The bit error rate input unit 25a, the error bit number input unit 25b, the clock cycle bit number input unit 25c, the calculation unit 25d, and the timing control unit 25e also can be configured with a digital circuit such as a field programmable gate array (FPGA), an application specific integrated circuit (ASIC) or the like. Alternatively, the bit error rate input unit 25a, the error bit number input unit 25b, the clock cycle bit number input unit 25c, the calculation unit 25d, and the timing control unit 25e also can be configured by combining a hardware process by a digital circuit and a software process by a predetermined program as appropriate.

A desired bit error rate ER of a test signal output from the combination unit 24 is input to the bit error rate input unit 25a, according to an operation on the operation unit 27 by a user.

A desired error bit number bE included in one burst error is input to the error bit number input unit 25b, according to an operation on the operation unit 27 by the user.

A bit number bits of a PAM4 signal included in one clock cycle is input to the clock cycle bit number input unit 25c. This bit number bits is a value determined by a structure of the error addition unit 23.

The calculation unit 25d calculates the minimum number of clock cycles required for realizing a desired bit error rate and the number of burst errors added to the MSB and the LSB output from the dividing unit 21 during a period of the minimum number of the clock cycles, based on the bit error rate ER input to the bit error rate input unit 25a, the error bit number bE input to the error bit number input unit 25b, and the bit number bits of the PAM4 signal included in one clock cycle.

The timing control unit 25e adds the number of burst errors calculated by the calculation unit 25d to the MSB and the LSB during a period of the minimum number of consecutive clock cycles calculated by the calculation unit 25d so as to generate a timing signal for controlling a timing of an error signal output from the error signal generation unit 22.

The error signal generation unit 22 generates an error signal according to the timing signal output from the timing control unit 25e. For example, the error signal includes a pattern in which one burst error is added to an MSB and an LSB for each of n (n is an integer equal to or more than 1) clock cycles being repeated m (m is an integer equal to or more than 1) times and a pattern in which one burst error is added to the MSB and the LSB for each of n+1 clock cycles being repeated p (p is an integer equal to or more than 1) times, during a period of the minimum number of consecutive clock cycles.

The display unit 26 is configured by a display device such as a liquid crystal display (LCD), a cathode ray tube (CRT), or the like, for example, and displays various display contents according to a control signal from the control unit 25. Further, the display unit 26 displays an operation target such as a soft key, a pull-down menu, a text box, and the like for setting various conditions.

The operation unit 27 is for receiving an operation input by a user, and is configured by a touch panel provided on a surface of a display screen of the display unit 26, for example. Alternatively, the operation unit 27 may be configured to include an input device such as a keyboard or a mouse. In addition, the operation unit 27 may be configured by an external control device which performs remote control by using a remote command or the like.

The operation input to the operation unit 27 is detected by the control unit 25. For example, the operation unit 27 can select MAC frame data to be output from the MAC frame data output unit 11, or the user can designate predetermined various parameters such as ER, bE, bits, and the like to be described below.

Hereinafter, an example of a process executed by the bit error rate input unit 25*a*, the error bit number input unit 25*b*, the clock cycle bit number input unit 25*c*, the calculation unit 25*d*, and the timing control unit 25*e* will be described.

First, according to an operation on the operation unit 27 by a user, the bit error rate ER, the error bit number bE per burst error, and the bit number bits per clock cycle are respectively input to the bit error rate input unit 25*a*, the error bit number input unit 25*b*, and the clock cycle bit number input unit 25*c*.

The bit error rate ER (=α×10−N) is expressed as the following equation (5) by using the bit error rate ER, the error bit number bE per burst error, the bit number bits per clock cycle, a focusing clock cycle number Tclock, and a burst error number B included in a period of Tclock clock cycles.

$$ER = \alpha \times 10^{-N} = \frac{B \times bE}{T_{clock} \times \text{bits}} \quad \text{Equation (5)}$$

Here, the denominator in Equation (5) is the total number of focusing bits, and the numerator represents the number of error bits included in the total number of focusing bits. In addition, B≤Tclock and bE≤bits.

Equation (5) can be transformed as Equation (6). In equation (6), the number of bits per clock cycle is 256.

$$\frac{T_{clock}}{B} = \frac{10^N \times bE}{\alpha \times 256} \quad \text{Equation (6)}$$

When Equation (6) is reduced, each of the numerator and the denominator is as described in Equation (7) and Equation (8).

$$T_{clock} = \frac{10^N \times bE}{GCF(\alpha \times 256, 10^N \times bE)} \quad \text{Equation (7)}$$

$$B = \frac{\alpha \times 256}{GCF(\alpha \times 256, 10^N \times bE)} \quad \text{Equation (8)}$$

Here, the denominators of Equation (7) and Equation (8) are the greatest common divisor of the numerator and the denominator of Equation (6). A value of Tclock given by Equation (7) is the minimum number of clock cycles required for realizing the desired bit error rate ER. In addition, the value B given by Equation (8) is the number of burst errors included in Tclock clock cycles given by Equation (7).

That is, the calculation unit 25*d* calculates Tclock and B according to Equation (7) and Equation (8). For example, if the bit error rate ER is 3×10−4 (that is, α=3 and N=4) and the error bit number bE is 3, Tclock is 625 and B is 16.

Further, the timing control unit 25*e* calculates n, m, and p already described according to the following equations (9) to (11).

$$n = \frac{T_{clock} - \mod\left(\frac{T_{clock}}{B}\right)}{B} \quad \text{Equation (9)}$$

$$m = B - \mod\left(\frac{T_{clock}}{B}\right) \quad \text{Equation (10)}$$

$$p = \mod\left(\frac{T_{clock}}{B}\right) \quad \text{Equation (11)}$$

Here, mod(Tclock/B) is the remainder when Tclock is divided by B. In this manner, by calculating n, m, and p, it is possible to approximately equally add B burst errors to the MSB and the LSB of the PAM4 signal output from the dividing unit 21 during a period of Tclock clock cycles.

Figure 2:
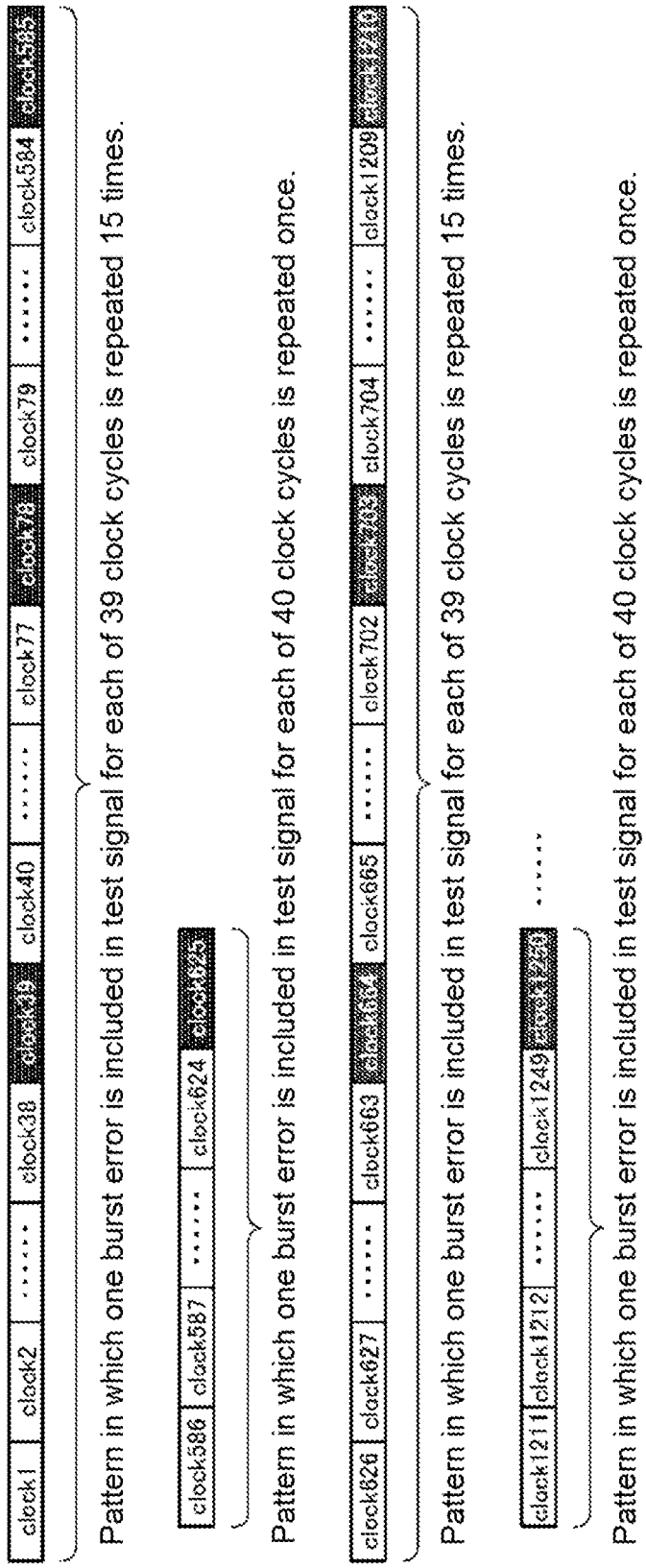
FIG. 2 is a diagram for explaining an appearance timing of a burst error, which is controlled by a control unit of a burst error addition device according to the embodiment of the present invention.

In a case of the example in which the bit error rate ER is 3×10−4, the error bit number bE is 3, Tclock is 625, and B is 16, n=39, m=15, and p=1 according to Equations (9) to (11). That is, as illustrated in FIG. 2, for 585 (=n ×m) clock cycles among 625 clock cycles, a pattern in which one burst error is included in a test signal for each of 39 clock cycles (illustrated in black) is repeated 15 times. In addition, for 40 (=(n+1)×p) clock cycles among the 625 clock cycles, a pattern in which one burst error is included in the test signal for each of 40 clock cycles is repeated once. The same manner is applied to the 626th and subsequent clock cycles.

In the example illustrated in FIG. 2, for the 625 consecutive clock cycles, after all patterns for each of the 39 clock cycles are repeated, the pattern for each of the 40 clock cycles is repeated once, but the present invention is not limited thereto. For example, the pattern for each of the clock cycles and the pattern for each of the 40 clock cycles may be arranged in a random order.

Figure 3:
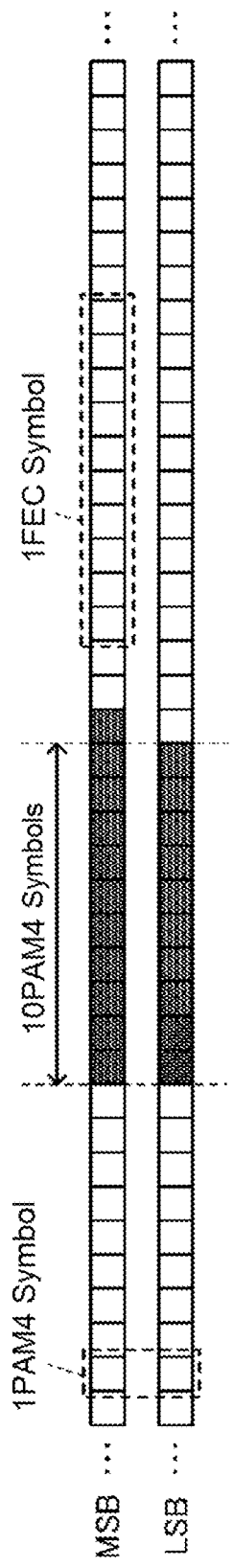
FIG. 3 is a diagram for explaining addition of a burst error to a PAM4 signal, which is controlled by the control unit of the burst error addition device according to the embodiment of the present invention.

The timing control unit 25*e* generates a timing signal for adding a burst error to each of the MSB and the LSB of the PAM4 signal output from the dividing unit 21, in units of clock cycles according to an appearance timing of the burst error obtained as described above. Since one PAM4 symbol has 2 bits, for example, in a case where the error bit number bE is 21, as illustrated in black in FIG. 3, errors for 11 PAM4 symbols are added to the MSB and the LSB.

Figure 4:
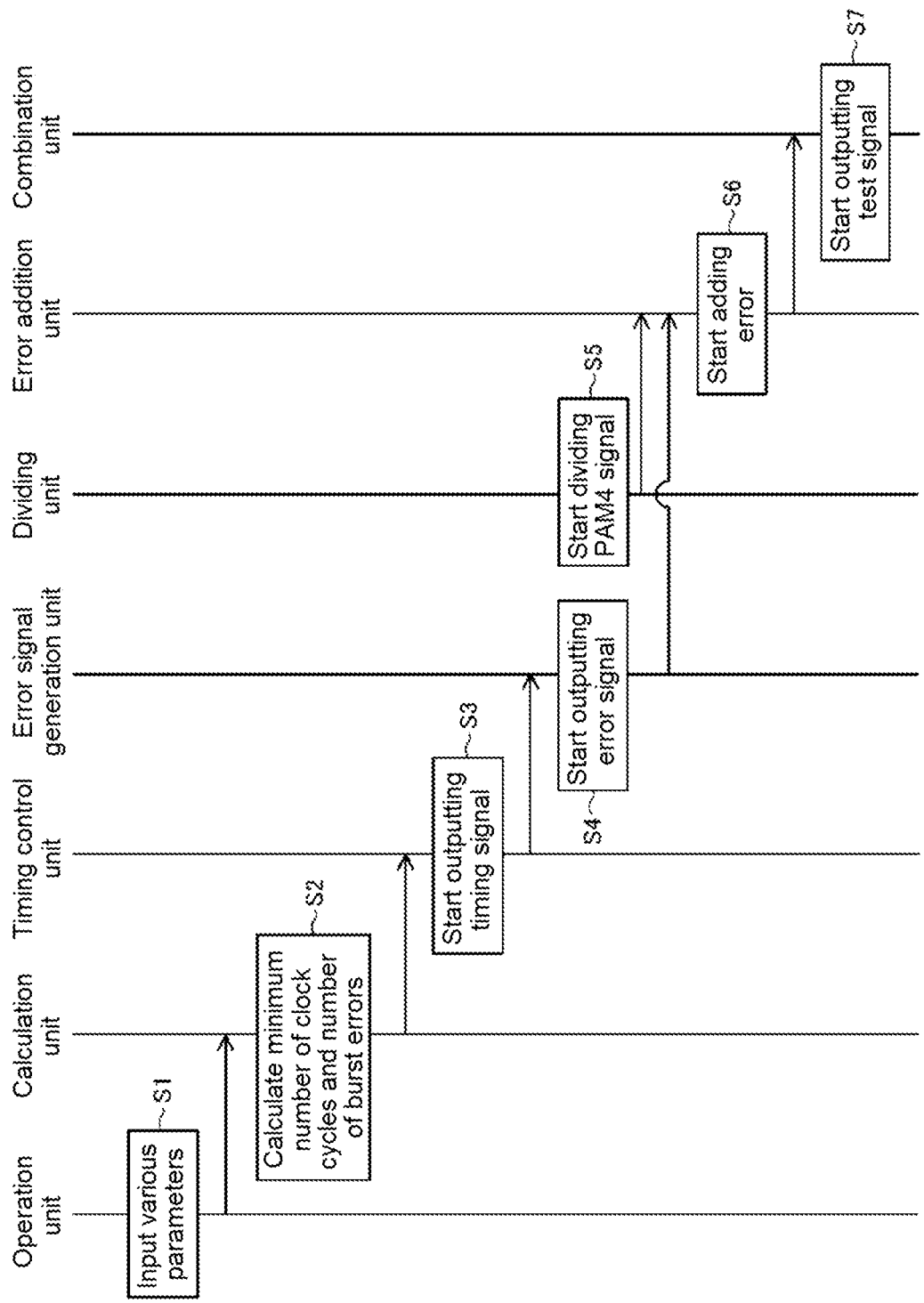
FIG. 4 is a sequence diagram for explaining a process of a burst error addition method using the burst error addition device according to the embodiment of the present invention.
Figure 5:
FIG. 5 is a table for explaining burst error removal by precoding.

Hereinafter, an example of a process of a burst error addition method using the burst error addition device 20 will be described with reference to the sequence diagram in FIG. 4.

First, various parameters are input by an operation on the operation unit 27 by a user (input step S1). These parameters include the bit error rate ER of a test signal, the error bit number bE included in one burst error, the bit number bits of a PAM4 signal included in one clock cycle, or the like.

Next, the calculation unit 25*d* calculates the minimum number of clock cycles required for realizing a desired bit error rate and the number of burst errors added to the MSB and the LSB of the PAM4 signal during a period of the minimum number of the clock cycles, based on the parameters such as the bit error rate ER, the error bit number bE, and the like input in input step S1 (calculation step S2).

Next, the timing control unit 25*e* starts outputting a timing signal for controlling a timing of an error signal output from the error signal generation unit 22 (step S3).

Next, the error signal generation unit 22 starts outputting the error signal for adding a burst error to each of the MSB and the LSB of the PAM4 signal output from the dividing unit 21, in units of clock cycles (error signal generation step S4). The error signal includes a pattern in which one burst error is added to an MSB and an LSB for each of n clock cycles being repeated m times and a pattern in which one burst error is added to the MSB and the LSB for each of n+1 clock cycles being repeated p times, during a period of the minimum number of consecutive clock cycles calculated in calculation step S2.

On the other hand, the dividing unit 21 starts a process of dividing the PAM4 signal output from the PAM4 signal output unit 10 into an MSB and an LSB (division step S5).

Next, the error addition unit 23 performs an XOR operation on the MSB and the LSB of the PAM4 signal output in division step S5 and the error signal output in error signal generation step S4, and outputting bit strings obtained as a result of the operation is started (error addition step S6).

Next, the combination unit 24 combines the bit strings of the MSB and the LSB output in error addition step S6 so as to generate a PAM4 signal to which a burst error is added, and starts a process of outputting the PAM4 signal to which the burst error is added as a test signal (combination step S7).

As described above, in the burst error addition device 20 according to the present embodiment, by designating a parameter such as the bit error rate ER of a test signal, the error bit number bE per burst error, or the like by a user, it is possible to generate a test signal for testing burst error tolerance in a communication apparatus which receives a precoded PAM4 signal. For example, in the burst error addition device 20 according to the present embodiment, since a burst error can be simultaneously added to an MSB and an LSB of the PAM4 signal, it is possible to evaluate tolerance of the burst error of the communication apparatus by changing the parameter described above.

DESCRIPTION OF REFERENCE NUMERALS AND SIGNS

10 PAM4 signal output unit
11 MAC frame data output unit
13 PAM4 processing unit
14 precode encoder
20 burst error addition device
21 dividing unit
22 error signal generation unit
23 error addition unit
24 combination unit
25 control unit
25a bit error rate input unit
25b error bit number input unit
25c clock cycle bit number input unit
25d calculation unit
25e timing control unit
26 display unit
27 operation unit
100 test signal generation device
200 DUT

What is claimed is:

1. A burst error addition device that adds a burst error to a precoded 4-level pulse amplitude modulation (PAM4) signal, the device comprising:
an dividing unit that divides the precoded PAM4 signal into a most significant bit (MSB) and a least significant bit (LSB);
an error signal generation unit that generates an error signal for adding the burst error to each of the MSB and the LSB in units of clock cycles;
an error addition unit that performs an exclusive OR operation on the MSB and the LSB and the error signal and outputs bit strings obtained as a result of the operation; and
a combination unit that combines the bit strings of the MSB and the LSB output from the error addition unit and outputs a PAM4 signal to which the burst error is added as a test signal.

2. The burst error addition device according to claim 1, further comprising:
a bit error rate input unit that receives a bit error rate of the test signal;
an error bit number input unit that receives the number of error bits included in the burst error;
a clock cycle bit number input unit that receives the number of bits of the PAM4 signal included in one clock cycle; and
a calculation unit that calculates the minimum number of the clock cycles required for realizing the bit error rate and the number of burst errors to be added to the MSB and the LSB during a period of the minimum number of the clock cycles, based on the bit error rate input to the bit error rate input unit, the number of error bits input to the error bit number input unit, and the number of bits of the PAM4 signal included in one clock cycle input to the clock cycle bit number input unit,
wherein the error signal generation unit outputs the error signal for adding the burst errors corresponding to the number of burst errors calculated by the calculation unit to the MSB and the LSB, to the error addition unit, during a period of the minimum number of the consecutive clock cycles calculated by the calculation unit.

3. The burst error addition device according to claim 1, wherein the error signal generation unit generates the error signal so that a pattern in which the one burst error is added to the MSB and the LSB for each of n clock cycles is repeated m times and a pattern in which one burst error is added to the MSB and the LSB for each of n+1 clock cycles is repeated p times, during a period of the minimum number of the consecutive clock cycles.

4. A test signal generation device comprising:
the burst error addition device according to claim 1; and
a PAM4 signal output unit that outputs the precoded PAM4 signal to the dividing unit of the burst error addition device.

5. A burst error addition method of adding a burst error to a precoded 4-level pulse amplitude modulation (PAM4) signal, the method comprising:
a dividing step of dividing the precoded PAM4 signal into a most significant bit (MSB) and a least significant bit (LSB);
an error signal generation step of generating an error signal for adding the burst error to each of the MSB and the LSB in units of clock cycles;
an error addition step of performing an exclusive OR operation on the MSB and the LSB and the error signal and outputting bit strings obtained as a result of the operation; and
a combination step of combining the bit strings of the MSB and the LSB output from the error addition step and outputting a PAM4 signal to which the burst error is added as a test signal.

6. The burst error addition method according to claim 5, further comprising:
- a bit error rate input step of receiving a bit error rate of the test signal;
- an error bit number input step of receiving the number of error bits included in the burst error;
- a clock cycle bit number input step of receiving the number of bits of the PAM4 signal included in one clock cycle; and
- a calculation step of calculating the minimum number of the clock cycles required for realizing the bit error rate and the number of burst errors to be added to the MSB and the LSB during a period of the minimum number of the clock cycles, based on the bit error rate input in the bit error rate input step, the number of error bits input in the error bit number input step, and the number of bits of the PAM4 signal included in one clock cycle input in the clock cycle bit number input step,
- wherein in the error signal generation step, the error signal for adding the burst errors corresponding to the number of burst errors calculated in the calculation step to the MSB and the LSB is output to the error addition step, during a period of the minimum number of the consecutive clock cycles calculated in the calculation step.

7. The burst error addition method according to claim 5, wherein in the error signal generation step, the error signal is generated so that a pattern in which the one burst error is added to the MSB and the LSB for each of n clock cycles is repeated m times and a pattern in which one burst error is added to the MSB and the LSB for each of n+1 clock cycles is repeated p times, during a period of the minimum number of the consecutive clock cycles.

* * * * *